(12) United States Patent
Kuo et al.

(10) Patent No.: US 8,431,218 B2
(45) Date of Patent: Apr. 30, 2013

(54) POLY (LACTIC ACID) RESIN COMPOSITION FOR PREPARING TRANSPARENT AND IMPACT-RESISTANT ARTICLE, ARTICLE PREPARED THEREFROM AND PREPARATION PROCESS THEREOF

(75) Inventors: Chih-Ying Kuo, Taipei (TW); Li-Ling Chang, Taipei (TW); Ru-Yu Wu, Taipei (TW); Yih-Wen Wang, Taipei (TW)

(73) Assignee: Far Eastern New Century Corporation (TW)

( * ) Notice: Subject to any disclaimer, the term of this patent is extended or adjusted under 35 U.S.C. 154(b) by 683 days.

(21) Appl. No.: 12/554,112

(22) Filed: Sep. 4, 2009

(65) Prior Publication Data

US 2010/0167048 A1    Jul. 1, 2010

(30) Foreign Application Priority Data

Dec. 31, 2008    (TW) ............................. 97151890 A

(51) Int. Cl.
*B32B 27/16*    (2006.01)
*B32B 27/18*    (2006.01)
*B32B 27/36*    (2006.01)

(52) U.S. Cl.
USPC ........... 428/327; 428/323; 428/331; 428/480; 524/183; 524/261; 524/262; 524/263; 524/265; 524/323; 524/379; 524/380; 524/381; 524/382; 524/392; 524/399; 528/274; 528/275; 528/279; 528/282; 528/285

(58) Field of Classification Search .......................... None
See application file for complete search history.

(56) References Cited

U.S. PATENT DOCUMENTS

| | | | |
|---|---|---|---|
| 5,525,671 A * | 6/1996 | Ebato et al. ..................... 525/53 |
| 6,166,169 A * | 12/2000 | Fritz et al. ..................... 528/272 |
| 6,495,631 B1 | 12/2002 | Randall et al. |
| 6,706,842 B1 * | 3/2004 | Duan ............................. 528/26 |
| 6,803,443 B1 * | 10/2004 | Ariga et al. ..................... 528/354 |
| 6,888,663 B2 | 5/2005 | Bourdelais et al. |
| 6,943,214 B2 | 9/2005 | Flexman |
| 7,160,977 B2 | 1/2007 | Hale et al. |
| 7,317,069 B2 * | 1/2008 | Aoshima et al. ............... 528/275 |
| 7,371,444 B2 * | 5/2008 | Kajikawa ..................... 428/32.64 |
| 7,465,770 B2 * | 12/2008 | Lewis et al. ..................... 525/415 |
| 7,718,718 B2 * | 5/2010 | Kanzawa et al. ............... 524/31 |
| 8,008,395 B2 * | 8/2011 | Zoromski et al. ............... 524/601 |
| 8,030,382 B2 * | 10/2011 | Endo et al. ..................... 524/141 |
| 2006/0230476 A1 * | 10/2006 | Atanasoska et al. .......... 977/933 |
| 2006/0252890 A1 | 11/2006 | Romenesko et al. |

FOREIGN PATENT DOCUMENTS

JP        09-165441    *    6/1997

OTHER PUBLICATIONS

Jingo Yin and Xuesi Chen; Journal of Materials Letters, 2007.

* cited by examiner

*Primary Examiner* — Vivian Chen
(74) *Attorney, Agent, or Firm* — Seyfarth Shaw LLP

(57) ABSTRACT

A poly(lactic acid) resin composition is provided, comprising (a) a poly(lactic acid) resin, (b) at least one modifier selected from at least one metal/nonmetal alkoxide, at least one metal/nonmetal alkoxide having at least one functional group capable of reacting with the poly(lactic acid) resin, or a mixture thereof, (c) a first catalyst, and (d) optionally, a second catalyst. A process for preparing a transparent and impact-resistant article from the poly(lactic acid) resin composition of the invention, and articles prepared therefrom are also provided.

19 Claims, 1 Drawing Sheet

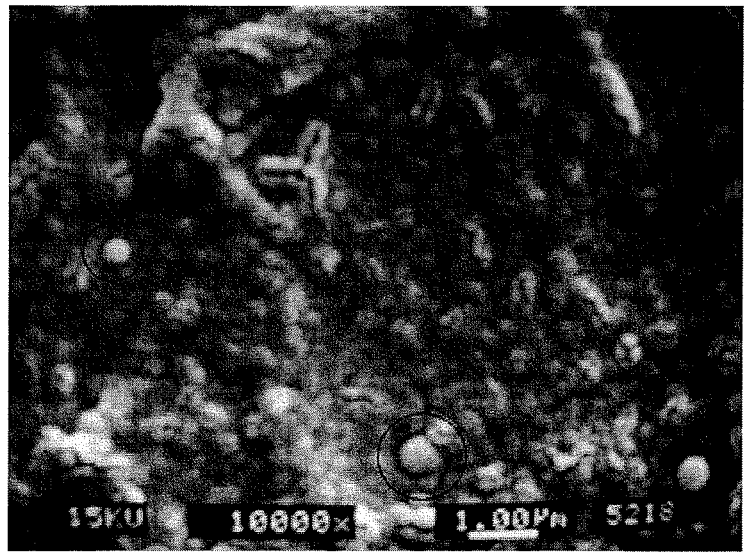

POLY (LACTIC ACID) RESIN COMPOSITION FOR PREPARING TRANSPARENT AND IMPACT-RESISTANT ARTICLE, ARTICLE PREPARED THEREFROM AND PREPARATION PROCESS THEREOF

BACKGROUND OF THE INVENTION

1. Field of the Invention

The present invention relates to a poly(lactic acid) resin composition for preparing transparent and impact-resistant articles.

2. Description of the Prior Art

With the increasing awareness of environmental protection, numerous manufacturers have gradually replaced the traditional plastics used for food packages or disposable packaging containers with biodegradable plastics, and among the biodegradable plastics, poly(lactic acid) (PLA) resins have the most preferable gloss and transparency. However, the articles made from PLA resin are known to have disadvantages such as high brittleness and poor impact resistance at room or low temperature, and are very likely to crack during transportation due to extrusion and collision. Take the current PLA resin containers widely used for packaging of fresh vegetables or frozen foods as example, if fragments formed by cracking of the containers during transportation fall onto the foods, the degree of customer trust is likely to decrease, and the repurchase rate will go down remarkably. As the brittle crack is caused by poor impact resistant strength of the PLA resin, if this disadvantage is to be eliminated, it is necessary to improve the impact resistant strength of the PLA resin.

It is known that a novel material can be obtained by subjecting two or more organic or inorganic materials having different properties to a blending process, and in this way, the properties of the original different materials can be reinforced in this new material. For example, U.S. Pat. No. 6,943,214 has disclosed a use of a polyoxymethylene (POM) polymer which has a property of low glass transition temperature (Tg). This material is processed with a PLA resin to form a mixture of POM and PLA (toughened polyoxymethylene-poly lactic acid compositions), which is said to improve the impact resistance of the original biodegradable plastic. However, it is known to persons skilled in the art that because the mixture of POM and PLA is an incompatible system, severe phase separation of the system will occur, and the modified PLA resin will become opaque. Moreover, in addition to the influence on the biodegradability of the PLA resin, the addition of the polyoxymethylene polymer only has a limited improving effect on the brittleness and impact resistance of the PLA resin. On the other hand, U.S. Pat. No. 6,495,631 improves the toughness of PLA with an epoxidized rubber, by adding an epoxy modifier capable of reacting with PLA resin to reduce phase separation and thus increase the impact resistance of the PLA resin. However, this technology can significantly reduce the biodegradability and transparency of the PLA resin, and also has a limited improving effect on impact resistance.

In order to improve the impact resistance of the PLA resin while maintaining its biodegradability, U.S. Pat. No. 6,803,443 has disclosed that the esterified product of lactide and a polyester is subjected to a ring-opening reaction by ring-opening polymerization, to form a copolymer (polylactide-co-polyester), which is then admixed into the PLA resin as an impact resistance modifier. Although the most preferred embodiment disclosed in U.S. Pat. No. 6,803,443 can achieve the effect of no crack at the detection limit of the analyzer, this technical method requires polymerization starting from the initial lactide to synthesize an impact-resistant co-polyester of PLA, and needs further blending and extrusion so as to improve the impact resistance of the PLA resin. Therefore, besides involving a process which is too complex to have high industrial applicability, this technical means will also significantly compromise the transparency of the PLA resin, thereby limiting the commercial application fields of the PLA resin.

U.S. Pat. No. 7,160,977 has disclosed that the product blended a soft biodegradable polymer (A) with a hard biodegradable polymer (B). The technique can be divided into four main systems: (1) A/B=aliphatic-aromatic copolyesters (AAPE)/poly(lactic acid) (PLA) or co-polyester plus lactic acid (CPLA); (2) A/B=polycaprolactone (PCL)/polyhydroxybutyrates (PHB); (3) A/B=polyhydroxybutyrate-hydroxyvalerate copolymers (PHBV)/polyglycolide (PGA); and (4) A/B=polybutylene succinate (PBS) or polyethylene succinate (PES) or polybutylene succinate adipate (PBSA)/PLA. Although in this technique, the blending of biodegradable polymers such as AAPE with PLA resins can improve the impact resistance of the resin while maintaining the original biodegradability, it has the disadvantage of compromising the transparency.

In the past few years, in addition to blending an exiting polymer material with two or more organic materials or polymers having different properties to improve the mechanical properties of the polymer, attempts have been made to add inorganic reinforcing materials, inorganic powders, or fibers, such as glass fibers, minerals and clays, to a polymer base to improve the strength and impact resistance of the polymer material. However, no matter whether dispersion of the inorganic supplement materials, inorganic powders, or fibers into the polymer substrate is achieved by mechanical blending, melt blending, or solvent blending, to the method involves physical blending. It is understood by persons skilled in the art that because these inorganic additives are generally in the form of powder or slurry, if they are simply added and mechanically stirred, they will be prone to severe secondary aggregation in the polymer material even if they are dispersed, so re-dispersion in the polymer material cannot be effectively achieved. Because the compatibility of the polymer base with the additives is an important factor affecting the mechanical properties of the material, sometimes the technical means not only does not improve the properties but results in deterioration of the properties instead.

For example, both U.S. Pat. No. 6,888,663 and US 2006/252890 teach use of powdered silicon- or ammonium-containing inorganic materials, for example, montmorillonite, smectite, mica, polyhedral oligomeric silsesquioxanes (POSS) and ammonium modified clay, to modify the polymer material, but the modification effects are not obvious due to poor powder dispersion. The bottleneck of the technical means lies in surface treatment and dispersion of inorganic powders. Nano inorganic powders, due to large specific surface area, are prone to agglomeration by secondary bonding (for example, hydrogen bond, electrostatic force, and Van der Waals force) on the surface. Furthermore, depending on the different polymer resins and the different functional improvement purposes to be achieved with inorganic powders, different surface treatment techniques may be needed, which makes the operation difficult and large-scale commercial production/supply impossible.

Some recent techniques teach dispersion of intercalated clay into a polymer base in the form of intercalation or exfoliation by means of admixing. However, the intercalated clay often needs to be treated with various surfactants to reach a certain intercalated distance and allow a polymer to enter between the layers, and desirable condition of complete exfoliation cannot be achieved in current mass production, so the technical means cannot significantly improve the mechanical properties of the polymer, either.

Since 1846, there has been extensive academic research on sol-gel systems ("sol-gel" in abbreviation). The sol-gel refers to a combination of two states where non-metal/metal alkoxide is gradually formed from a liquid state into a colloid state through hydrolyzation, condensation, polymerization and the like, and further into nanoparticles with a porous net-like structure having a large surface area. In general, when the sol-gel process is used to produce glass or ceramics, alkoxide monomer, for example, $Si(OR)_4$, in which R can be $CH_3$, $C_3H_7$, and the like, is often used as the precursor. Sol-gel process generally includes three steps, namely, hydrolyzation, condensation and polymerization. In the entire reaction, condensation occurs simultaneously with hydrolyzation, rather than starting after complete hydrolyzation. Furthermore, acid or base can also be added in the reaction as catalyst, and the sol-gels generated under different catalytic conditions will have different structures. In acidic conditions, quick hydrolyzation and slow condensation will occur; therefore, the structure tends to be in the form of long chain, and a net-like structure having low crosslinking degree will be formed. In basic conditions, the hydrolyzation rate is slower than the condensation rate; therefore, the monomer will grow into branched chain, and form an un-uniform colloid particle having high crosslinking degree.

In 2007, Jingo Yin and Xuesi Chen proposed in Journal of Materials Letters that, in the presence of solvent tetrahydrofuran (THF), in addition to the plasticizers, PLA and polyethylene glycol (PEG), tetraethoxysilane (TEOS) be introduced into the sol-gel process; at controlled hydrolyzation rate, the hydrolyzed compound was co-polycondensed in the polymer solution to form a gel, and the mixed solution was placed into an oven at high temperature to remove the residual solvent THF and obtain a PLA-silica nanocomposition. However, the literature only discloses that silicon oxide can be used to improve the tensile strength and thermal stability of the PLA resin, and the process has to be carried out in the presence of a lot of solvent. As known to persons of skill in the art, drying and recovery of a lot of solvent are extremely difficult, thus, this means is not suitable for commercial mass production.

In summary, there still is a need for a technical solution in the industry which caneliminates the disadvantages of the PLA resin such as brittleness and poor impact resistant strength at room/low temperature while maintaining the original biodegradability and transparency of the PLA resin, and which has a simple process flow to facilitate commercial mass production. It is found by the inventors of the present invention through extensive research that the PLA resin composition having the components defined herein can efficiently solve the problem.

SUMMARY OF THE INVENTION

In order to eliminate the disadvantages such as high brittleness and poor impact resistance at room or low temperature of PLA, the present invention employs a melt blending technique to modify the biodegradable PLA resin with a metal/nonmetal alkoxide modifier. The present invention can not only reduce the brittleness of PLA resin and improve its physical properties such as impact resistance at room/low temperature, but also maintain its specific biodegradability and transparency. Moreover, the modification process for the PLA resin provided by the present invention is simple, so large-scale commercialization can be realized.

The present invention is directed to a PLA resin composition, comprising: (a) a PLA resin; (b) at least one modifier selected from at least one metal/nonmetal alkoxide, at least one metal/nonmetal alkoxide having at least one functional group capable of reacting with the PLA resin, or a mixture thereof; (c) a first catalyst, and (d) optionally, a second catalyst.

The PLA resin composition of the present invention can be used to prepare a PLA resin article which is transparent, impact resistant, and biodegradable.

The present invention is further directed to a process for preparing a transparent and impact-resistant article from the PLA resin composition of the present invention.

The present invention is further directed to an article prepared from the PLA resin composition of the present invention which can be widely used in various fields involved in daily life.

BRIEF DESCRIPTION OF THE DRAWINGS

FIG. 1 is a SEM photo of a transparent and impact-resistant PLA resin prepared in Example 3.

DETAILED DESCRIPTION

The composition for preparing a transparent and impact-resistant PLA resin article of the present invention comprises: (a) a PLA resin; (b) at least one modifier selected from at least one metal/nonmetal alkoxide, at least one metal/nonmetal alkoxide having at least one functional group capable of reacting with the PLA resin, or a mixture thereof, (c) a first catalyst, and (d) optionally, a second catalyst.

The biodegradable PLA resin useful in the present invention has a weight average molecular weight preferably in the range of 30,000-800,000, more preferably in the range of 40,000-400,000, and particularly preferably in the range of 70,000-120,000. Without wishing to be bound by theory, it is believed that the PLA resin with a molecular weight of less than 30,000 is difficult to exhibit desirable physical properties such as mechanical properties and thermal stability, and the PLA resin with a molecular weight of greater than 800,000 is also not applicable due to high melt viscosity and thus poor processability. The PLA resin suitable in the present invention includes, but is not limited to, poly-L-lactic acid (PLLA), poly-D-lactic acid (PDLA), poly-D,L-lactic acid (PDLLA), and a mixture thereof.

The present invention mainly uses at least one biodegradable modifier to modify the biodegradable PLA resin, thereby enhancing its impact resistance and reducing its brittleness, so that the commercially available PLA resin can be more useful as a transparent packaging material at room/low temperature.

The modifier for the PLA resin suitable in the present invention is selected from at least one metal/nonmetal alkoxide, at least one metal/nonmetal alkoxide having at least one functional group capable of reacting with the PLA resin, or a mixture thereof. According to one embodiment of the present invention, the amount of the modifier for the PLA resin used is 0.1 to 50 weight parts based on 100 weight parts of the PLA resin (which can also be expressed as 0.1-50 phr (parts per hundreds of resin)); and preferably 1 to 30 weight parts (1-30 phr).

When the modifier for the PLA resin is at least one metal/nonmetal alkoxide, the metal/nonmetal alkoxide preferably has a general formula of (1) $M_1R_1R_2R_3R_4$, in which $M_1$ is, but not limited to, a tetravalent non metal selected from silicon or selenium, or a tetravalent metal selected from titanium or zirconium, and $R_1$, $R_2$, $R_3$ and $R_4$, which may be identical or different, are represented by —O—$(CH_2)_n$—$CH_3$, where n is an integer of 0-10; or (2) $M_2R'_1R'_2R'_3$, in which $M_2$ is, but not limited to, a trivalent non metal selected from boron or arsenic, or a trivalent metal selected from aluminum, iron or antimony, and $R'_1$, $R'_2$ and $R'_3$, which may be identical or different, are represented by —O—$(CH_2)_n$—$CH_3$, where n is an integer of 0-10. Preferably, the metal/nonmetal alkoxide is tetramethoxysilane (TMOS) or tetraethoxysilane (TEOS).

When the modifier for the PLA resin is at least one metal/nonmetal alkoxide having at least one functional group capable of reacting with the PLA resin, the metal/nonmetal alkoxide having at least one functional group capable of reacting with the PLA resin preferably has a general formula of (1) $M_1X_1X_2X_3X_4$, in which $M_1$ is, but not limited to, a tetravalent non metal selected from silicon or selenium, or a tetravalent metal selected from titanium or zirconium, and at least one of $X_1$, $X_2$, $X_3$ and $X_4$ is —O—$(CH_2)_n$—Y, and the rest are independently represented by —O—$(CH_2)_n$—$CH_3$, provided that not all of $X_1$, $X_2$, $X_3$ and $X_4$ are —O—$(CH_2)_n$—Y, where n is an integer of 0-10, and Y is a functional group selected from (a) Cl, Br, I, or the other halo groups, (b) —N=C=O, (c) —COCl, (d) —COOH, (e) —OH, (f) epoxy, (g) amino, or (h) —C=C; or (2) $M_2X'_1X'_2X'_3$, in which $M_2$ is, but not limited to, a trivalent non metal selected from boron or arsenic, or a trivalent metal selected from aluminum, iron or antimony, and at least one of $X'_1$, $X'_2$, and $X'_3$ is —O—$(CH_2)_n$—Y, and the rest are independently represented by —O—$(CH_2)_n$—$CH_3$, provided that not all of $X'_1$, $X'_2$, and $X'_3$ are —O—$(CH_2)_n$—Y, where n is an integer of 0-10, and Y is a functional group selected from (a) F, Cl, Br, or I, (b) —N=C=O, (c) —COCl, (d) —COOH, (e) —OH, (f) epoxy, (g) amino, or (h) —C=C. Preferably, the metal/nonmetal alkoxide having at least one functional group capable of reacting with the PLA resin is glycidoxypropyltrimethoxysilane (GPTMS), glycidoxypropylmethyldiethoxysilane, or glycidoxypropyltriethoxysilane.

According to a preferred embodiment of the invention, the modifier for the PLA resin is a mixture of at least one metal/nonmetal alkoxide and at least one metal/nonmetal alkoxide having at least one functional group capable of reacting with the PLA resin. The metal/nonmetal alkoxide is mixed with the metal/nonmetal alkoxide having at least one functional group capable of reacting with the PLA resin at a ratio of 1:99-99:1, and preferably 40:60-60:40.

The PLA resin composition of the present invention is required to further comprise a first catalyst to promote sol-gel reaction of the metal/nonmetal alkoxide modifier and/or the metal/nonmetal alkoxide modifier having at least one functional group capable of reacting with the PLA resin under a weak acidic condition when melt blended with the PLA resin to undergo an in situ hydrolysis-polycondensation in the melted PLA resin, thereby forming nanoparticles aggregate (i.e., sol-gel) with a particle size of about 2-1500 nm which is uniformly dispersed in the PLA resin. Because the particle size is below the threshold value for particle dispersion (Dr. S H Wu, Polymer International 29, 9, 1992), the impact resistance of the PLA resin can be significantly improved.

The first catalyst useful in the composition of the present invention to promote sol-gel reaction of the modifier includes, but is not limited to, $H_2SO_4$, HCl, toluene-4-sulfonic acid, methyl hexahydrophthalic anhydride (MHHPA), trifluoroacetic acid (TFA), $CH_3COOH$, or a mixture thereof. According to one embodiment of the present invention, the amount of the first catalyst used is 0.1 to 15 weight parts, preferably 1 to 10 weight parts, and more preferably 4-6 weight parts, based on 100 weight parts of the modifier.

When the metal/nonmetal alkoxide having at least one functional group capable of reacting with the PLA resin is used as the modifier for the PLA resin in the composition of the present invention, for the purpose of covalently bonding the metal/nonmetal alkoxide having at least one functional group capable of reacting with the PLA resin to PLA to further improve the dispersion uniformity and stability, a second catalyst has to be added to the PLA resin composition of the present invention to facilitate the functional group of the metal/nonmetal alkoxide to covalently bond to the terminal functional group (e.g. —OH and —COOH) of the PLA resin. Without wishing to be bound by theory, it is believed that the second catalyst enables the nanoparticle aggregates formed from the modifier and uniformly distributed in the PLA resin to further covalently bond to the PLA, so as to reduce phase separation, improving the dispersion stability, and thus the transparency, of the modified impact-resistant PLA resin.

The second catalyst useful in the composition of the present invention includes, but is not limited to, triphenyl phosphine, triphenyl phosphate, triphenyl phosphite, or a mixture thereof. According to one embodiment of the present invention, the amount of the second catalyst used is 0.01 to 0.5 weight parts, and preferably 0.15 to 0.25 weight parts, based on 100 weight parts of the modifier (i.e. the metal/nonmetal alkoxide modifier having at least one functional group capable of reacting with the PLA resin).

Depending on the manufacture process or the application, the PLA resin composition of the present invention may further comprise additional ingredients well known to persons having ordinary skill in the art, for example, but not limited to, thermal stabillizar, coloring agent, antistatic agent, flame retardant, foaming agent, anti-UV stabilizer, anti-sliding agent, plasticizer, inorganic filler, anti-oxidant, and/or lubricant, which do not adversely affect the composition of the present invention.

By a simple melt blending process, a PLA resin article which has significantly reduced brittleness and improved room/low-temperature impact-resistant strength while maintaining excellent biodegradability and transparency can be prepared from the PLA composition of the present invention.

The present invention further provides a process for preparing a PLA resin article from the PLA composition of the present invention, comprising blending the following components under a weak acidic condition by a melt blending process: (a) a PLA resin; (b) at least one modifier selected from at least one metal/nonmetal alkoxide, at least one metal/nonmetal alkoxide having at least one functional group capable of reacting with the PLA resin, or a mixture thereof, (c) a first catalyst, and (d) optionally, a second catalyst.

The melt blending process applicable in preparation of the PLA resin article of the present invention is well known to persons having ordinary skill in the art. According to one embodiment of the present invention, the melt blending process is carried out in an extruder.

By using the melt blending technique to modify the biodegradable PLA resin with the metal/nonmetal alkoxide modifier, the present invention can not only reduce the brittleness of the PLA resin and enhance its physical properties such as impact resistance at room/low temperature, but also maintain its biodegradability and transparency. As demonstrated by experimental data, the transparent and impact-resistant PLA resin prepared by the modification process of the present invention has at least the following features:

(1) As compared with the one without the addition of the modifier of the present invention, the transparent and impact-resistant PLA plastic sheet with the addition of the modifier of the present invention has a nearly 5-fold increase in impact resistance strength from 40 g/mm to 190 g/mm in the ball dropping impact test according to ASTM D1709.

(2) As compared with the one without the addition of the modifier of the present invention, the impact-resistant PLA plastic sheet prepared in the present invention has a more than 15-fold increase in tensile deformation from 9% to 500% in a tensile test according to ASTM D412, which indicates that the addition of the modifier of the present invention can increase the toughness of the unmodified PLA, thereby reducing its brittleness.

(3) Under a scanning electron microscope, the impact-resistant PLA prepared in the present invention can be observed to have nanoparticle aggregates formed from the modifier, uniformly distributed in the PLA resin and with a particle size of less than 1000 nm.

(4) The impact-resistant PLA plastic sheet with the addition of the plastic modifier of the present invention has a haze of less than 10% as measured in a haze meter according to ASTM D1003, which indicates that the impact-resistant PLA plastic sheet prepared in the present invention still has good transparency after being modified.

The modified PLA resin prepared in the present invention has excellent physical properties which may enable the PLA resin to be more perfectly and fully developed in the future. The modified PLA resin of the present invention can be made with conventional plastic molding techniques into various articles widely used in daily life, for example, but not limited to, PLA plastic sheets, coated paper containers, bowls, plates and food boxes (for example, sweet-soup bowls, frappe bowls, sushi boxes, braised food boxes, salad boxes, cake boxes, moon cake boxes and top covers), transparent cups (for example, drink cups, ice-cream cups, mashed ice cups and pudding cups), room-temperature packaging materials (for example, vegetable and fruit packages, egg boxes, sandwich boxes and hamburger boxes), low-temperature freezing/preserving boxes (for example, sliced meat boxes), and injection molded tableware (for example, knifes and forks, stirring pods, and spoons) and other injection molded products.

The following embodiments are provided to describe the composition of the PLA resin composition of the present invention and the tests performed on it. However, they are not intended to limit the scope of the present invention, and all modifications and changes easily made by any person having ordinary skill in the art fall within the scope of the present invention.

EXAMPLES

Preparation of Biodegradable Plastic Modifier (1) Modifier A:

1.5 kg of a biodegradable plastic modifier A containing more than two silicon alkoxide monomers capable of auto-polymerization was prepared. First, a first catalyst ($H_2SO_4$) was adjusted with deionized water to pH 2, and 75 g of the first catalyst (pH 2) were added to a beaker (A). Next, 3 g of a second catalyst (triphenylphosphine, TPP) were added to the beaker (A) to be completely dissolved into the solution above, and stood for use. Afterwards, 750 g of TEOS were added into a beaker (B), and then 750 g of GPTMS were added and thoroughly stirred to mix uniformly. Before use, solution (A) was homogenously mixed with solution (B).

(2) Modifier B:

Changing the modifier into TEOS alone, and using only the first catalyst ($H_2SO_4$), a biodegradable plastic modifier B containing only one silicon alkoxide monomer capable of auto-polymerization was prepared following the steps above.

(3) Modifier C:

Changing the modifier into GPTMS alone, and using both the first ($H_2SO_4$) and the second catalyst (TPP), a biodegradable plastic modifier C containing only one silicon alkoxide monomer having a functional group capable of reacting with the PLA resin and capable of auto-polymerization was prepared following the steps above.

Preparation of Transparent and Impact-Resistant PLA Resin Blended with Modifier

Example 1

Preparation of 15.1 kg of Impact-Resistant PLA Resin Added with 1 phr of Biodegradable Plastic Modifier 15 kg of PLLA (purchased from NatureWorks Company, US) were placed into the pre-feed roller of a twin screw extruder, where the operation conditions of the twin screw extruder included: aspect ratio of the screw: L/D=32, temperature profile of the screw: 190□, 195□, 200□, 210□, and 200□, and die temperature: 200□. 150 g of the modifier A described above were fed with a peristaltic pump dispenser at an average feeding rate of 2.5 g/min, co-extruded in the extruder, stripped and granulated, to produce a total of about 15.1 kg of transparent and impact-resistant PLA resin granules. Various property tests were performed on the transparent and impact-resistant PLA resin granules, and the test results are shown in table 1 below.

Example 2

Preparation of 15.4 kg of Impact-Resistant PLA Resin Added with 3 phr of Biodegradable Plastic Modifier The amount of the modifier A added was changed to 450 g, the feeding rate of the peristaltic pump dispenser used was changed to 15 g/min, and the other preparation steps and conditions were the same as in Example 1. A total of about 15.4 kg of transparent and impact-resistant PLA resin granules were obtained. Various property tests were also performed on the resultant transparent and impact-resistant PLA resin granules, and the test results are also shown in table 1 below.

Example 3

Preparation of 16.5 kg of Impact-Resistant Poly(lactic acid) Resin Added with 10 phr of Biodegradable Plastic Modifier The amount of the modifier A added was changed to 1500 g, the feeding rate of the peristaltic pump dispenser used was changed to 25 g/min, and the other preparation steps and conditions were the same as in Example 1. A total of about 16.5 kg of transparent and impact-resistant PLA resin granules were obtained. Various property tests were also performed on the resultant transparent and impact-resistant PLA resin granules, and the test results are also shown in table 1 below.

Example 4

Preparation of 19.5 kg of Impact-Resistant Poly(lactic acid) Resin Added with 30 phr of Biodegradable Plastic Modifier The amount of the modifier A added was changed to 4500 g, the feeding rate of the peristaltic pump dispenser used was changed to 150 g/min, and the other preparation steps and conditions were the same as in Example 1. A total of about 19.5 kg of transparent and impact-resistant PLA resin granules were obtained. Various property tests were also performed on the resultant transparent and impact-resistant PLA resin granules, and the test results are also shown in table 1 below.

Example 5

Preparation of 16.5 kg of Impact-Resistant Poly(lactic acid) Resin Added with 10 phr of Biodegradable Plastic Modifier The modifier used was changed to modifier B, and the other preparation steps and conditions were the same as in Example 3. A total of about 16.5 kg of transparent and impact-resistant PLA resin granules were obtained. Various property tests were also performed on the resultant transparent and impact-resistant PLA resin granules, and the test results are also shown in table 1 below.

Example 6

Preparation of 16.5 kg of Impact-Resistant Poly(lactic acid) Resin Added with 10 phr of Biodegradable Plastic Modifier The modifier used was changed into modifier C, and the other preparation steps and conditions were the same as in Example 3. A total of about 16.5 kg of transparent and impact-resistant PLA resin granules were obtained. Various property tests were also performed on the resultant transparent and impact-resistant PLA resin granules, and the test results are also shown in table 1 below.

Test Methods and Results (1) Ball Dropping Impact Tester: Impact Resistance Evaluation The test steps and conditions were as described in ASTM D1709. First, the prepared impact-resistant PLA resin granules were extruded into a plastic sheet with an average thickness of 0.7 mm using a thick plastic sheet extruder, and then the plastic sheet was tailored into a rectangle of 10 cm×15 cm. Ball dropping impact data could be obtained with a ball head diameter of the ball dropping impact tester of 1.4 cm and a dropping weight of 10 N, and separation and dropping of fragments of the modified PLA plastic sheet after impaction could also be observed at the same time. The test results are shown in table 1.

(2) Instron Tensile Machine: Toughness/Brittleness Evaluation

The test steps and conditions were as described in ASTM D412. First, the prepared impact-resistant PLA resin granules were extruded into a plastic sheet with an average thickness of 0.7 mm using a thick plastic sheet extruder, and then the plastic sheet was tailored into the shape and size required by ASTM D412. The tensile deformation could be obtained with a set tensile rate of 5 mm/min and 100 mm/min. The test results are as shown in table 1.

(3) IZOD Impact Tester: Impact Resistance Evaluation

The test steps and conditions were as described in ASTM D256. First, the prepared impact-resistant PLA resin granules were made into a test piece in the form of a cuboid with a specification of 3 mm×10 mm×55 mm using an injection molding machine. These test pieces were divided into two types, notched and unnotched, and tested on an IZOD impact tester separately. The test results are shown in table 1.

(4) Nanoparticle Size analyzer

The test steps and conditions were as described in ISO13320. First, the prepared impact-resistant PLA resin granules were dissolved into THF, then the solution was poured into a glass container and then into the analyzer, and the particle size of the inorganic particles in the solution was analyzed on the basis of light diffraction principle. The test results are shown in table 1.

(5) Haze Meter

The test steps and conditions were as described in ASTM D1003. The prepared impact-resistant PLA resin granules were pressed at 200□ into a sheet at a set thickness of 0.5 mm, then the sample was quickly cooled with liquid nitrogen and placed in a haze meter, and the haze value of the impact-resistant PLA was read. The test results are shown in table 1.

TABLE 1

| Tested Property | Control | Example 1 | Example 2 | Example 3 |
|---|---|---|---|---|
| Ball Dropping Impact Resistance (g/mm) | 40 | 100 | 120 | 180 |
| IZOD Impact Resistance (J/m) Notched Test Piece | 16.3 | 20 | 27 | 38 |
| IZOD Impact Resistance (J/m) Unnotched Test Piece | 170 | 200 | 300 | x |
| Tensile Elongation (%) | 9 | 10 | 10 | 30 |
| Haze (%) | 3.3 | 4.5 | 5.5 | 7 |
| Average Particle Size Of Colloid (μm) | 0 | 0.25 | 0.33 | 0.5 |

| Tested Property | Example 4 | Example 5 | Example 6 |
|---|---|---|---|
| Ball Dropping Impact Resistance (g/mm) | 190 | 120 | 110 |
| IZOD Impact Resistance (J/m) Notched Test Piece | 39 | 25 | 16.4 |
| IZOD Impact Resistance (J/m) Unnotched Test Piece | X | 223 | 171 |
| Tensile Elongation (%) | 500 | 10 | 10 |
| Haze (%) | 6.6 | 5.5 | 6.6 |
| Average Particle Size Of Colloid (μm) | 1 | 0.5 | 0.5 |

Control: PLLA without the addition of the modifier of the present invention (purchased from NatureWorks Company, US)
x: denotes not broken ($\geq$450 J/m)

(6) SEM (Scanning Electron Microscope)

The prepared impact-resistant PLA resin granules were pressed at 200□ into a sheet, then the sample was quickly cooled with liquid nitrogen and slightly pressed to naturally crack the sample. Before observation, the sample was Au plated so as to be conductive, and then placed into a scanning electron microscope. The broken section of the impact-resistant PLA was then observed, and a micro-phase structure in which the modifier of the present invention existed in the PLA resin could be found. FIG. 1 is a SEM photo of the transparent and impact-resistant PLA resin obtained in Example 3. It can be seen from FIG. 1 that the nanoparticle aggregates formed from the modifier are uniformly dispersed in the PLA resin, and have a particle size of less than 1000 nm.

(7) Biodegradability Test

On the basis of CNS 14432 (ISO 14855, ASTM D5338), the impact-resistant PLA composition prepared in Example 3 was made into a plastic sheet using a single screw plastic sheet extruder, and tested for its biodegradability. The biodegradation rate data obtained in the biodegradability test were expressed as percent of the organic carbons in the PLA composition product converted into carbon dioxide, and the results are shown in table 2 below. It can be seen from table 2 that PLA composition of the present invention meets the regulatory requirement that the biodegradation rate in 180 days reach 90%. This result shows that the impact-resistant PLA composition of the present invention still has the biodegradability of the original PLA resin.

TABLE 2

| | Example 3 | | | | | |
|---|---|---|---|---|---|---|
| | Days | | | | | |
| | 0 | 30 | 70 | 100 | 140 | 170 |
| Biodegradation Rate (%) | 0 | 22.01 | 54.37 | 65.53 | 81.86 | 90.33 |

As demonstrated by the experimental data, the modified PLA resin of the present invention has very good properties in terms of, for example, impact resistance and toughness, while maintaining the transparency and biodegradability of the PLA resin.

While the present invention has been disclosed as above with preferred embodiments, the present invention is not limited to them, and some changes and modifications can be made by any person of skill in the art without departing from the spirit and scope of the invention as defined by the appended claims.

We claim:

1. An article prepared from
   a poly(lactic acid) resin composition comprising:
   (a) a poly(lactic acid) resin;
   (b) at least one modifier selected from the group consisting of at least one metal/nonmetal alkoxide and at least one metal/nonmetal alkoxide having at least one functional group capable of reacting with the poly(lactic acid) resin, wherein the modifier is uniformly dispersed into the poly(lactic acid) resin in the form of a nanoparticle aggregate with a particle size of less than 1000 nm.; and
   (c) a first catalyst,
   the article having an impact resistant strength of 100 to 190 g/mm as measured by a ball dropping impact test according to ASTM D1709.

2. The article according to claim 1, wherein the poly(lactic acid) resin is at least one member selected from the group consisting of poly-L-lactic acid (PLLA), poly-D-lactic acid (PDLA), and poly-D-L-lactic acid (PDLLA).

3. The article according to claim 1, wherein the poly(lactic acid) resin has an average molecular weight of 30,000 to 800,000.

4. The article according to claim 1, wherein the the modifier is 0.1 to 50 weight parts based on 100 weight parts of the poly(lactic acid) resin.

5. The article according to claim 1, wherein the modifier is present in an amount of 1 to 30 weight parts based on 100 weight parts of the poly(lactic acid) resin.

6. The article according to claim 1, wherein the metal/nonmetal alkoxide has a formula of (1) $M_1R_1R_2R_3R_4$, wherein $M_1$ is a tetravalent nonmetal selected from the group consisting of silicon or selenium, or a tetravalent metal selected from the group consisting of titanium or zirconium, and $R_1$, $R_2$, $R_3$ and $R_4$ are represented by —O—$(CH_2)_n$—$CH_3$, wherein n is an integer of 0-10; or (2) $M_2R'_1R'_2R'_3$, wherein $M_2$ is a trivalent non metal selected from boron or arsenic, or a trivalent metal selected from aluminum, iron or antimony, and $R'_1$, $R'_2$ and $R'_3$ are represented by —O—$(CH_2)_n$—$CH_3$, wherein n is an integer of 0-10.

7. The article according to claim 6, wherein the metal/nonmetal alkoxide is tetramethoxysilane (TMOS) or tetraethoxysilane (TEOS).

8. The article according to claim 1, wherein the metal/nonmetal alkoxide having at least one functional group capable of reacting with the poly(lactic acid) resin has a formula of (1) $M_1X_1X_2X_3X_4$, wherein $M_1$ is a tetravalent non metal selected from silicon or selenium, or a tetravalent metal selected from titanium or zirconium, and at least one member selected from the group consisting of $X_1$, $X_2$, $X_3$ and $X_4$ is —O—$(CH_2)_n$—Y, and members of the group consisting of $X_1$, $X_2$, $X_3$ and $X_4$ other than said at least one member are represented by —O—$(CH_2)_n$—$CH_3$, provided that not all members of the group consisting of $X_1$, $X_2$, $X_3$ and $X_4$ are —O—$(CH_2)_n$—Y, wherein n is an integer of 0-10, and Y is a functional group selected from the group consisting of (a) Cl, Br, I, or the other halogen groups, (b) —N═C═O, (c) —COCl, (d) —COOH, (e) —OH, (f) epoxy, (g) amino, and (h) —C═C; or (2) $M_2X'_1X'_2X'_3$, wherein $M_2$ is a trivalent nonmetal selected from the group consisting of boron and arsenic, or a trivalent metal selected from the group consisting of aluminum, iron or antimony, and at least one member selected from the group consisting of $X'_1$, $X'_2$, and $X'_3$ is —O—$(CH_2)_n$—Y, and members of the group consisting of $X'_1$, $X'_2$ and $X'_3$ other than said at least one member are represented by —O—$(CH_2)_n$—$CH_3$, provided that not all members of the group consisting of $X'_1$, $X'_2$, and $X'_3$ are —O—$(CH_2)_n$—Y, wherein n is an integer of 0-10, and Y is a functional group selected from the group consisting of (a) F, Cl, Br, or I, (b) —N═C═O, (c) —COCl, (d) —COOH, (e) —OH, (f) epoxy, (g) amino, and (h) —C═C.

9. The article according to claim 8, wherein the metal/nonmetal alkoxide having at least one functional group capable of reacting with the poly(lactic acid) resin is glycidoxypropyltrimethoxysilane (GPTMS), glycidoxypropylmethyldiethoxysilane, or glycidoxypropyltriethoxysilane.

10. The article according to claim 1, wherein the first catalyst is at least one member selected from the group consisting of $H_2SO_4$, HCl, toluene-4-sulfonic acid, methyl hexahydrophthalic anhydride (MHHPA), trifluoracetic acid (TFA), and $CH_3COOH$.

11. The article according to claim 1, wherein the first catalyst is present in an amount of 0.1 to 15 weight parts based on 100 weight parts of the modifier.

12. The article according to claim 1, wherein the modifier is a mixture of at least one metal/nonmetal alkoxide and at least one metal/nonmetal alkoxide having at least one functional group capable of reacting with the poly(lactic acid) resin, wherein the metal/nonmetal alkoxide is mixed with the metal/nonmetal alkoxide having at least one functional group capable of reacting with the poly(lactic acid) resin at a ratio of 1:99-99:1.

13. The article according to claim 1, having a tensile deformation of 10-500% as measured by a tensile test according to ASTM D412.

14. The article according to claim 1, having a haze of less than 10% as measured by a haze meter according to ASTM D1003.

15. The article according to claim 1, further comprising a second catalyst.

16. The article according to claim 15, wherein the second catalyst is at least one member selected from the group consisting of triphenyl phosphine, triphenyl phosphate, and triphenyl phosphite.

17. The article according to claim 15, wherein the second catalyst is present in an amount of 0.01 to 0.5 weight part based on 100 weight parts of the metal/nonmetal alkoxide modifier having at least one functional group capable of reacting with the poly(lactic acid) resin.

18. A process for preparing a poly(lactic acid) resin, comprising:
 blending (a) a poly(lactic acid) resin; (b) at least one modifier selected from the group consisting of at least one metal/nonmetal alkoxide, and at least one metal/nonmetal alkoxide having at least one functional group capable of reacting with the poly(lactic acid) resin; and (c) a first catalyst, under an acidic condition by a melt blending process.

19. The process according to claim 18, wherein the melt blending process is carried out in an extruder.

* * * * *